Jan. 30, 1962   M. J. STURTEVANT   3,019,048
WINDOW ASSEMBLY CONSTRUCTION
Filed Dec. 29, 1958   2 Sheets-Sheet 2
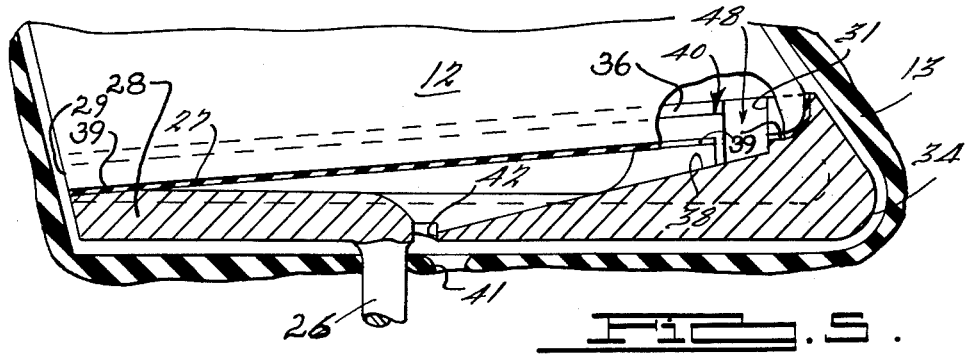
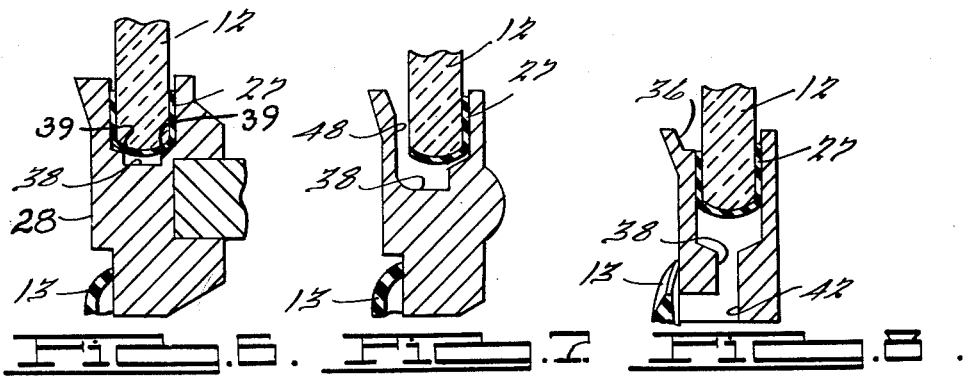
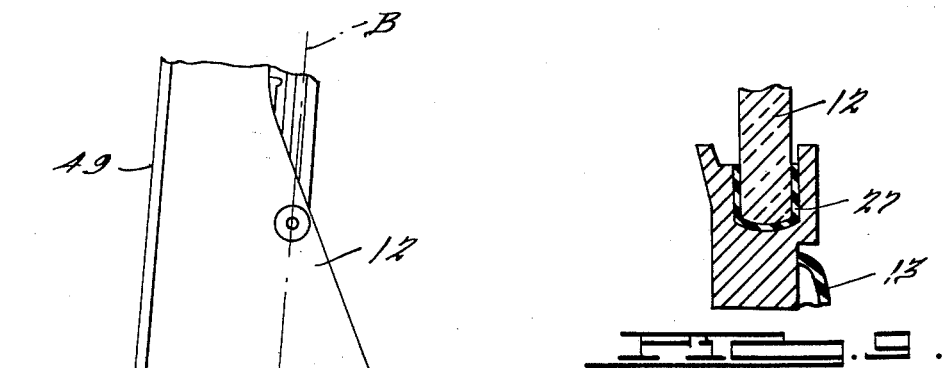
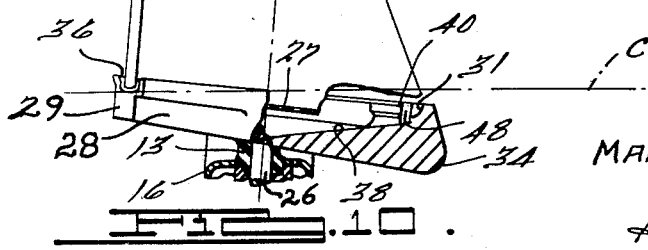
INVENTOR.
MARK J. STURTEVANT.
BY
Harness and Harris
ATTORNEYS.

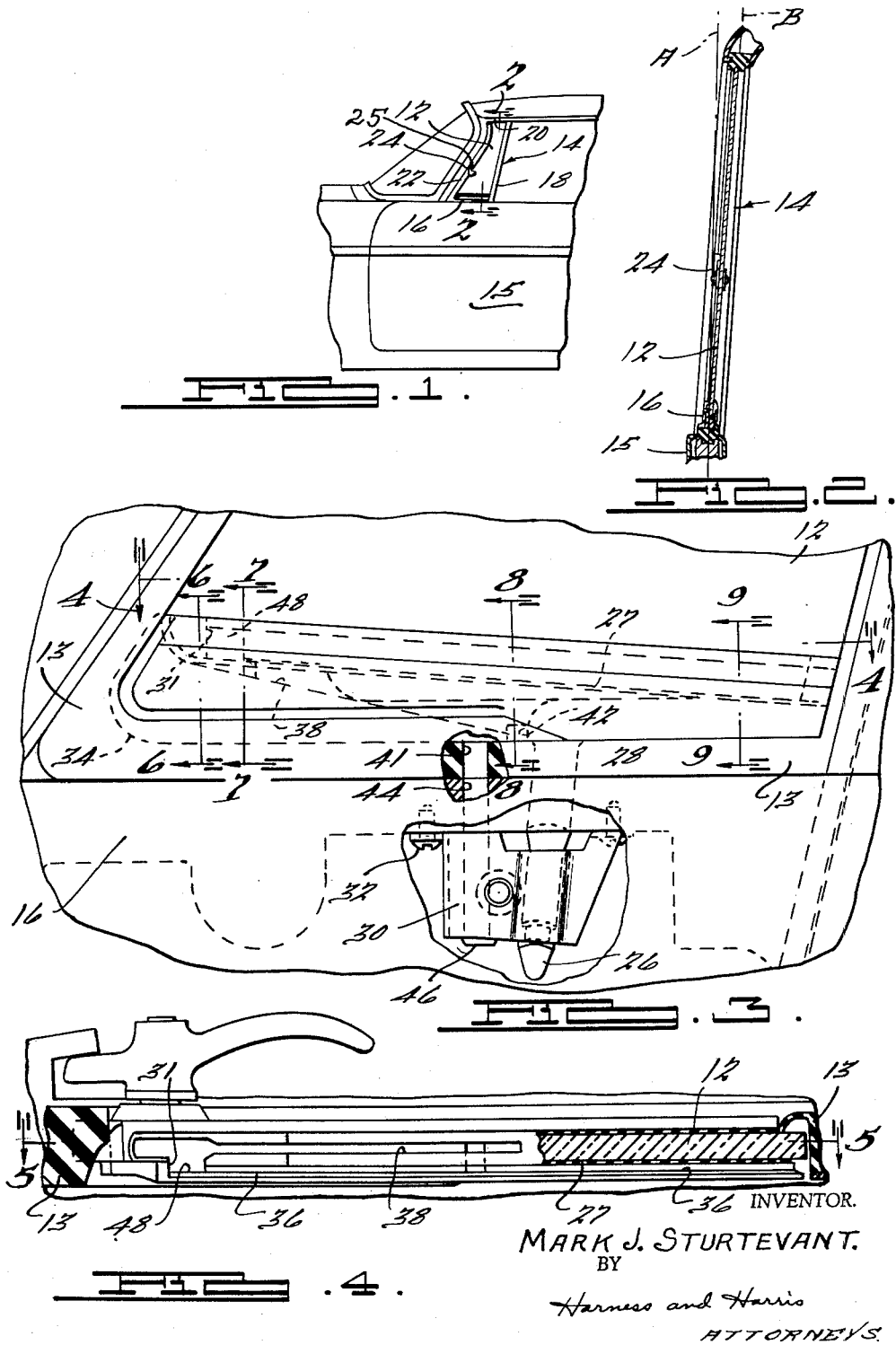

United States Patent Office 3,019,048
Patented Jan. 30, 1962

3,019,048
WINDOW ASSEMBLY CONSTRUCTION
Mark J. Sturtevant, Grosse Pointe, Mich., assignor to Chrysler Corporation, Highland Park, Mich., a corporation of Delaware
Filed Dec. 29, 1958, Ser. No. 783,505
8 Claims. (Cl. 296—44)

This invention relates to window assembly construction and in particular to a water drainage system for use in the window supporting members of pivotally mounted windows of automotive vehicles.

In automotive vehicles having inwardly slanted sides and windows pivotally mounted therein such as vent windows which are pivotal about an axis slanted with respect to the vertical to correspond in design to the slanted sides of the vehicle, a problem exists of preventing the water which strikes the open pivoted window from draining along the bottom support of the window to the interior of the automobile where it may drop on the floor or on the occupants. This drainage is caused by the downward slope of the bottom support of the vent window which slope is caused by the slanting pivotal axis of the window. This drainage is accentuated by the movement of air forwardly of the vent window in an inward and downwardly inclined direction.

Heretofore, various types of drainage systems have been provided on pivoted vent windows to drain off the water running along the bottom support, to the interior of the door and hence to the exterior of the automobile through drain holes in the bottom door sill. These drainage systems may be adequate for vent window installations wherein the pivotal axis of the window is vertical or substantially so, however, due to the drainage angles of their conduits these systems cannot be used successfully on automobiles having the modern slanting sides and slanted vent window pivotal mounting axis.

The present invention has for its major object the provision of a drainage system in the bottom support of vent window assemblies which can drain off water to the exterior of the car even though the vent window support extends into the passenger compartment of the car when the window is opened and has a downward slant with respect to the horizontal axis of the car.

This object is accomplished in the present invention by providing a lower drain conduit or surface in the window support which conduit is doubled back under and slants downwardly from the forward end of the upper drain conduit or surface of the support and which is substantially parallel to the horizontal axis of the car or slants downwardly from the interior to the exterior of the car when the vent window is opened. This lower drain conduit may thereby drain water from the forward end of the upper drain conduit or surface extending into the car when the vent window is open regardless of the direction or degree of slant of the upper drain conduit or surface.

Further objects and advantages will become apparent from the following description and drawings, in which:

FIGURE 1 represents an automobile having a vent window assembly;

FIGURE 2 represents a view of the vent window assembly of FIGURE 1 taken along the line 2—2 thereof and showing the axis of pivotal mounting with respect to the vertical axis of the car;

FIGURE 3 represents a view partly broken away of the vent window assembly of FIGURE 1 showing the pivotal mounting structure;

FIGURE 4 represents a sectional view of the lower portion of the vent window assembly taken along the line 4—4 of FIGURE 3 in the direction of the arrows with parts of the glass removed;

FIGURE 5 represents a view partly broken away of the lower portion of the vent window assembly taken along the line 5—5 of FIGURE 4 in the direction of the arrows;

FIGURE 6 represents a cross sectional view of the bottom channel support structure taken along the line 6—6 of FIGURE 3 in the direction of the arrows;

FIGURE 7 represents a cross sectional view of the bottom channel support structure taken along the line 7—7 of FIGURE 3 in the direction of the arrows;

FIGURE 8 represents a cross sectional view of the bottom channel support structure taken along the line 8—8 of FIGURE 3 in the direction of the arrows;

FIGURE 9 represents a cross sectional view of the bottom channel support structure taken along the line 9—9 of FIGURE 3 in the direction of the arrows; and FIGURE 10 represents a view partly broken away of the opened vent window of FIGURE 1.

Referring to the drawings, a front vent window 12 secured in supporting member 28 by sealing means 27 is pivotally mounted in a window frame generally designated 14 lined with a molding seal 13 and secured to a car door 15. Frame 14 comprises a bottom frame member 16, a rear frame member 18, a top frame member 20, and a front frame member 22.

Referring to FIGURES 1 and 2, the window 12 is pivotally mounted on the front frame member 22 by an upper pivot bearing means comprising pivot stud 24 secured to window 12 which stud is pivotally received in bearing 25 secured to member 22. As shown in FIG. 3, window 12 is mounted on the bottom frame member 16 by a lower pivot bearing means comprising a pivot stud 26 which is integral with the support 28 and projects through seal 13 into a lower pivot bearing 30 secured to the bottom frame member 16 by suitable means 32. Seal 13 is secured in member 16 against movement thereon. The upper and lower pivot bearing means have a common axis of rotation which axis is slanted inwardly to the vertical axis of the car from the lower to the upper bearing means as shown in FIGURE 2 wherein the vertical axis of the car is designated by line A and the pivotal axis of the vent window is designated by line B. It is further seen from FIGURE 10 that pivoting of window 12 about its axis B to an open position will cause the leading portion 34 of the support 28 to swing in a downward and inward arc with respect to the horizontal and vertical axis of the car respectively to impart a downward slant to the entire support 28.

As shown in FIGURE 5, the support 28 is provided with an upper drain conduit, surface, or trough 36 which extends from the trailing end 29 of the support to a dam 31 adjacent the leading end 34 thereof and which is constructed at a convenient angle to the horizontal axis C (see FIGURE 10) of the car when the vent window is closed. It is possible to construct this trough to give it a reverse slant, with respect to the horizontal, to that shown in FIGURE 10 to facilitate drainage to the exterior of the vehicle. In the structure as shown in FIGURE 10 however, the upper drain trough assumes a downwardly slanting position when the vent window is opened and if left by itself would drain water from the outside of the car to the passenger compartment as stated above.

The present invention prevents this drainage situation by providing a lower drain conduit 38 extending substantially underneath the glass 12 which rests on shoulders 39 at either end of conduit 38. Conduit 38 extends substantially the full length of support 28 and connects the end 40 of drain conduit 36 to outlet 42 which may be located adjacent the lower window pivot 26 or elsewhere along member 28. Outlet 42 communicates with the interior of the door through a molding seal drain hole 41, a drain aperture 44 in the bottom frame member 16, and through a drain in pivot bearing 30 to hole 46. This lower drain conduit 38 connects to the forward end 40 of the upper drain conduit 36 by means of a short connecting passage 48. As an alternative construction, passage 48 could be eliminated by running conduit 38 into conduit 36 at an angle.

It is readily seen from FIGURE 10 that rain or other forms of precipitation striking the portion 49 of the open vent window protruding outwardly from the side of the car will tend to run down the window into trough 36 through which it will flow downwardly and inwardly to the end 40 thereof. Since the lower trough 38 is doubled back underneath trough 36 and is substantially parallel to the horizontal axis C of the car when the window is in an open position, the water will flow from trough 36 through passage 48 into trough 38 and hence successively through drains 42, 41, 44, and 46 to the interior of the door 15 from which it may drain to the outside through holes suitably located in the door sill.

I claim:

1. A vent window assembly for a vehicle having a passenger compartment, said assembly comprising a vent window secured in a bottom support, a vent window frame, said support being pivotally mounted in said frame and having a leading end adapted to be moved into said passenger compartment of said vehicle upon pivoting of said window and support, said frame being normally slanted inwardly from bottom to top with respect to the passenger compartment to provide a pivotal axis for said window and support that is also normally slanted inwardly with respect to said compartment, an upper drain surface on said support, means forming a lower drain surface in said support underlying said upper surface, and a drain outlet in the bottom of said support connecting said lower surface to the exterior of said support, said surfaces being connected adjacent said leading end and diverging from each other from said end, said lower drain surface slanting downwardly from said leading end at a sufficient angle to allow drainage of water from said upper surface to said drain outlet when said leading end of said support is moved through any angle into the passenger compartment.

2. A bottom support for a vent window for use in the inwardly slanted sides of automotive vehicles, said support comprising a body having a leading and a trailing end, means on said body for pivotally mounting the same in said slanted sides so that the pivotal axis of said body and vent window is also slanted inwardly, a window supporting upper surface on said body, means forming an upper drain trough adjacent said upper surface extending from said trailing end of said body and terminating short of said leading end of said body to form a dam thereat, a drain aperture in the bottom surface of said body intermediate the ends thereof, and lower drain conduit means in said body communicating with said aperture and said trough adjacent said dam, said lower drain conduit sloping downwardly at an angle from said trough to said aperture, said angle being sufficient to impart a slope to said lower drain conduit downwardly with respect to the horizontal axis of said vehicles toward the exteriors thereof when said window and support are pivoted so as to position the leading end of said support within the interior of the vehicles.

3. In a vent window assembly for a vehicle having a slanting side, and a window secured to an upper support and a lower support, each said support being adapted for pivotal mounting on said side of said vehicle on a common axis slanted with respect to the vertical axis of said vehicle to correspond to the slant of said side, drain means on said lower window support comprising an upper drain trough in the upper surface of said lower support extending from one end thereof and terminating short of the other end thereof to form a dam thereat, said other end being adapted to be positioned interiorly of said vehicle upon pivoting of said window, a drain aperture in the bottom surface of said support intermediate the ends thereof, and lower drain conduit means in said support communicating with said aperture and said trough adjacent said dam, said lower drain conduit sloping downwardly at an angle from said trough to said aperture, said angle being greater than the angle of slant of said common axis to allow water to drain from said trough to said aperture when said other end of said support is positioned interiorly of said vehicle.

4. In a vent window assembly comprising an elongated bottom window support having a leading and a trailing end, an upper and a bottom surface, and adapted for pivotal mounting in a slanting side of a vehicle wherein the pivotal axis of the window is slanted at a predetermined angle from the vertical to correspond to the slant of said side and impart thereby a downward slant from the trailing end to the leading end of the support when the window is opened, drain means on said support comprising a drain trough in said upper surface of said support extending from said trailing end thereof and terminating short of said leading end thereof to form a dam adjacent said leading end, a drain aperture in said bottom surface of said support intermediate the ends thereof, and means in said support forming a lower drain conduit therein communicating with said aperture and said trough near said leading end, said lower drain conduit sloping downwardly from said trough to said aperture to convey water from said trough to said drain aperture when said window is in any of a plurality of open positions.

5. In a vent window assembly comprising a window secured to an elongated bottom window support having a leading and a trailing end, an upper and a lower surface, and adapted for pivotal mounting in a frame wherein the pivotal axis of the window and support is offset from the vertical to impart a downward slant to the lower surface of said support from the trailing to the leading end thereof when the window is pivoted about its axis to any of a plurality of positions, means forming a drain trough in said upper surface of said support extending from said trailing end thereof and terminating short of said leading end thereof to form a dam adjacent said leading end, a drain aperture in said support intermediate the end thereof and lying below said drain trough, and means in said support forming a lower drain conduit therein connecting said aperture and said trough at a point near said leading end, said lower drain conduit sloping downwardly at an angle, from said trough to said aperture, said angle being at least equal to the angle which the pivotal axis makes with the vertical so that said lower drain conduit will have a downward slant with respect to the horizontal when said window is moved to any of said plurality of positions to convey water from said trough to said drain aperture.

6. In a lower support member for a vent window adapted to be pivotally mounted in the inwardly slanting side of a passenger vehicle so that the pivotal axis of the window is also slanted inwardly, said member having a leading and a trailing end, means for conveying water from the top surface of said member to the exterior of the passenger compartment of the vehicle when said leading end of said member is positioned within the passenger compartment of said vehicle due to rotation about said axis, said means comprising a trough formed in the top surface of said member and extending lengthwise thereof from the trailing end to a point adjacent the leading end, means in said member forming a lower drain conduit extending from said trough adjacent said leading end of said member rearwardly toward said trailing end and sloping downwardly from said trough, and outlet means in said member near said pivotal axis connecting said lower drain conduit to the exterior of said vehicle, said conduit making an angle with the horizontal at least equal to the angle between the pivotal axis of the window and the vertical to impart a downward slope to said conduit from the interior to the exterior of said passenger compartment when the leading end of said member is within said compartment and said window is substantially transversely positioned with respect to the longitudinal axis of the vehicle.

7. In a motor vehicle body having structure defining a window opening and a vent window axis extending generally in an up and down direction and inclined laterally of the vehicle body with the upper extremity of the axis closer than its lower extremity to the vertical longitudinal center plane of the motor vehicle, a vent window assembly having a leading portion ahead of the above axis, said vent window assembly being pivotally mounted for arcuate movement about the above mentioned axis to one station in which said vent window assembly is in registry with a portion of said opening to effectively seal the same and to a second station in which the leading portion of said vent window is located inwardly of the aforementioned body structure, the inclination of the above mentioned axis being effective to position the leading portion of said vent window at a lower elevation in its second station than in its first station, said vent window assembly including a transparent panel and supporting structure along the lower edge thereof, said supporting structure having an open trough extending along substantially the entire length of the outer lower portion of said panel to receive moisture collected by said panel, said supporting structure further including a drainage conduit connected to said trough near the leading end thereof, said conduit lying below said trough, and an outlet in said supporting structure lying below said trough and connected to said conduit at a point intermediate the ends of said supporting structure.

8. In a lower support member for a vent window adapted to be pivotally mounted in the side of a passenger vehicle with the pivotal axis inclined at an angle to the vertical whereby pivoting of the window positions one end of the lower support member within the passenger compartment of the vehicle and lower than when said window is in its closed position, drain means on said lower support member comprising: an upper drain trough extending longitudinally of said support; means forming a drain aperture in the bottom surface of said support; and lower drain conduit means communicating between said upper drain trough adjacent the aforesaid one end of said support and said drain aperture means, said lower conduit means sloping downwardly from said upper trough at an angle to the horizontal sufficient to impart a slope toward the exterior of the vehicle when said vent window is pivoted so as to position the aforesaid one end of said bottom support within the interior of the vehicle.

References Cited in the file of this patent

UNITED STATES PATENTS

| | | |
|---|---|---|
| 2,354,443 | Schirra | July 25, 1944 |
| 2,517,205 | Hoag | Aug. 1, 1950 |
| 2,547,911 | Heyck | Apr. 3, 1951 |
| 2,570,744 | Anderson | Oct. 9, 1951 |
| 2,587,354 | Mauck | Feb. 26, 1952 |
| 2,672,365 | Stanton | Mar. 16, 1954 |

FOREIGN PATENTS

| | | |
|---|---|---|
| 154,134 | Australia | Nov. 12, 1953 |